Nov. 2, 1943.  A. PATERSON  2,333,271
METHOD OF PRODUCING BAR SECTIONS FROM METAL SCRAP
Filed Jan. 6, 1941
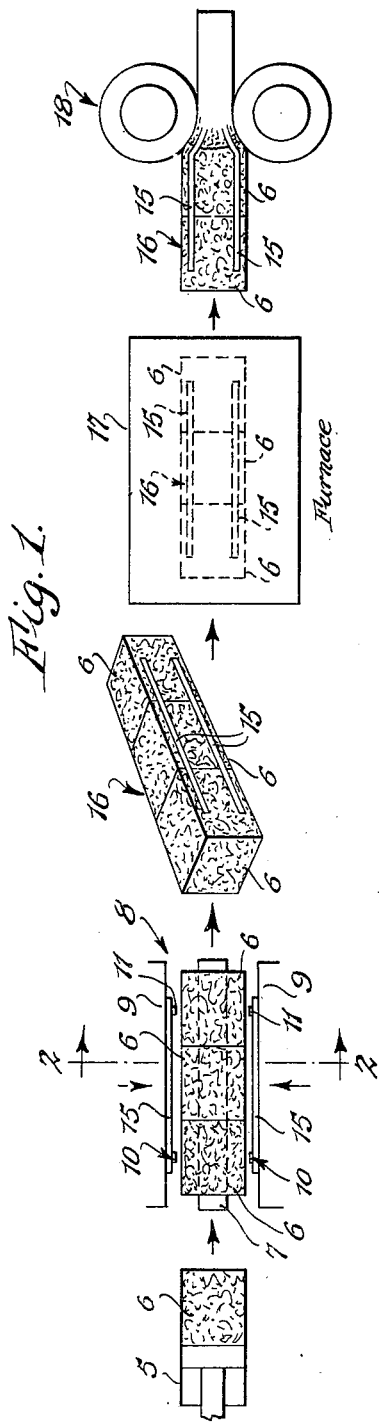
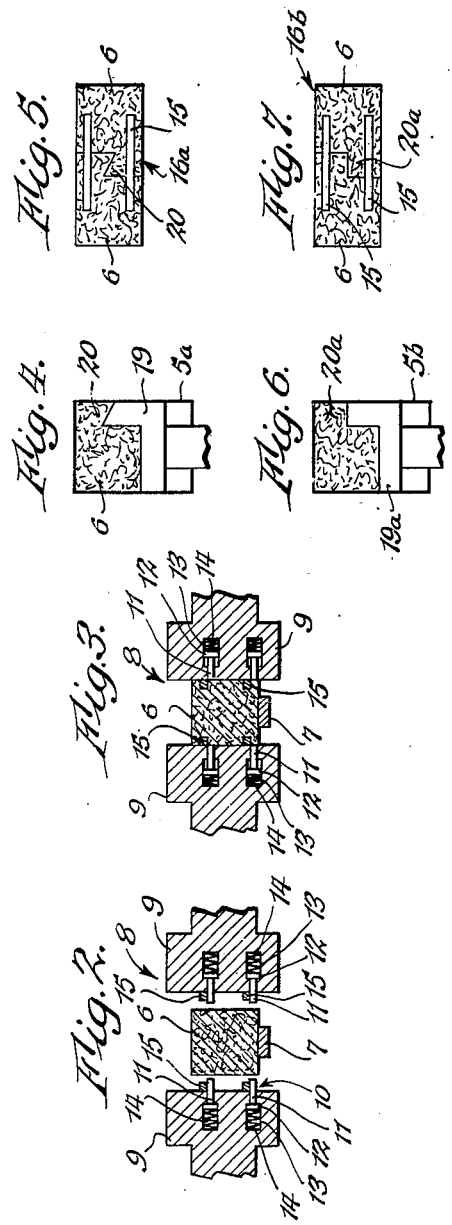
INVENTOR
Alexander Paterson
BY
John S. Powers
ATTORNEY Patented Nov. 2, 1943

2,333,271

UNITED STATES PATENT OFFICE 2,333,271

METHOD OF PRODUCING BAR SECTIONS FROM METAL SCRAP

Alexander Paterson, Buffalo, N. Y.

Application January 6, 1941, Serial No. 373,284

3 Claims. (Cl. 29—160.5)

This invention relates to a method of converting steel scrap into bar sections or the like suitable for the production of articles which, owing to their intended use, need not be, and hence ordinarily are not, formed of high grade steel; and the invention also involves a novel multi-bale unit which may be produced by the practice of the method and which may be reduced by rolling into a bar section of the character described.

The utilization of steel scrap in accordance with the invention involves the formation of the scrap in a preliminary reducing operation into briquettes or bales, the assembling of the briquettes or bales into elongated, composite, multi-bale units, either as ingots or billets, and the rolling of the units into billets or bar sections. In the preliminary reduction of the scrap any suitable press may be employed so long as the briquettes or bales produced have a density high enough to render them stable and self-sustaining. The density of the briquettes or bales being predetermined, their shapes and dimensions are dependent upon the capacity of the particular press in which the reduction is effected. In the formation of the multi-bale units, therefore, these factors are taken into consideration and the bales arranged in such relation and in such numbers as to provide elongated units having shapes and dimensions best adapted to promote high speed and efficient reduction in the subsequent rolling operation.

The principal object of the invention is to provide a method which is simple and economical, which may be carried out with conventional mill equipment and which does not involve, or require the use of, expensive installations.

A further object is to provide a method of making an elongated multi-bale unit having dimensions which are not limited in any substantial degree by the characteristics of the press in which the preliminary reduction is effected and which may be predetermined to enable rapid and effective reduction in a rolling operation.

The invention is illustrated in the accompanying drawing wherein:

Figure 1 is a diagrammatic view illustrating apparatus for carrying out the method.

Figure 2 is an enlarged section through the press which embeds the tie elements into the bales to bind the latter into a composite, self-sustaining unit and is taken along line 2—2 of Figure 1.

Figure 3 is a similar section taken along the same line and shows the positions of the jaws of the press at the completion of their working strokes.

Figure 4 is a diagrammatic view of a press for compressing the scrap into a modified form of bale.

Figure 5 is a view in elevation of a unit formed from two such bales.

Figure 6 is a diagrammatic view of a press for producing another modified form of bale.

Figure 7 is an elevational view of a unit formed from two such bales.

In carrying out the process the metal scrap is introduced into a suitable baling press 5 and given a preliminary reduction to thereby form a briquette or bale 6 of the desired density, for example, a density of the order of 40% of that of solid steel and in any event of a value which will render the bale self-sustaining and insure stability in the subsequent heating and rolling operations. A plurality of the bales, which may be standard in so far as shape and dimensions are concerned, are arranged end-to-end, or side-by-side if desired, upon a table 7 of a press 8, the table being stationary and supporting the bales between a pair of cooperating jaws 9 which are movable toward and away from one another in a horizontal plane and each of which carries a pair of pins 10.

The latter have stems 11 (Figure 2) which project outwardly from the faces of the jaws and heads 12 which are located in bores 13. Springs 14 which are accommodated in the bores 13 are located behind the heads 12 and act against the latter to hold the stems normally extended as shown in Figures 1 and 2. When thus extended the stems 11 provide supports upon which tie elements 15 may be arranged so that they bridge the joints between the adjacent ends of the bales. The elements 15 are preferably in the form of rods and may be of scrap or specially prepared for the purpose in view, the stems 11 supporting them adjacent opposite sides of the bales in spaced relation with respect to the longitudinally extending edges of the said sides.

While the bales and tie elements are supported in the relation described the jaws 9 of the press are advanced toward one another and during this operation the tie elements are first engaged and then forced into the sides of the bales, the stems 11 of the pins 10 entering the bores 13 against the action of the springs 14 as this occurs, as shown in Figure 3. A composite ingot-like, or billet-like, multi-bale unit 16 is thus formed. Preferably the working strokes of the jaws 9 are predetermined to cause the tie elements to penetrate the bales so that their outer faces are substantially co-planar, or flush, with the sides of the bales. The bales of the unit 16 are thus firmly and securely held together so that the unit is in effect, and may be handled as, a single elongated bale, the number and arrangement of the tie elements being predetermined so that the unit will have sufficient rigidity to resist any tendency of the individual bales to separate from one another as a result of rough handling or of the heating and rolling operations to be described. In this connection it is to be understood that the tie elements 15 may be of any desired shape and arrangement, that, if preferred, they may be embedded in the sides of the bales in a rolling operation, that the unit 16 may be further reinforced by embedding additional tie elements in the sides of the bales, either in the sides illustrated or in the remaining sides, or both, and that prior to the operation in which the tie elements are embedded in the bales in the manner described the surfaces of the bales which abut one another in the unit, and the remaining surfaces, if desired, may be impregnated or coated with tar, a charcoal compound or any other suitable welding material.

The unit 16 may be cold rolled as taught in my Patent No. 2,211,984 of August 20, 1940 to provide an ingot or billet of suitable form and density for hot finish rolling. Preferably, however, the unit is first heated to a welding heat, that is to say until it becomes spongy and plastic without, however, losing its form or stability, and for this purpose is introduced into a furnace 17 after which it is reduced in rolls 18 into a billet or bar, the section thus produced being suitable for the manufacture of nuts, bolts, forming steels, toys, table legs and other articles which need not be, and which for economical reasons ordinarily are not, of high grade steel.

It will thus be apparent that the method described has the advantage that it enables the production and rolling of ingot-like and billet-like units having shapes and dimensions predetermined to insure high speed and efficient reduction despite the size, capacity and other operating limitations which may be characteritic of the particular press employed to effect the initial reduction of the scrap.

Although the bales which comprise the unit may be of standard shape and formed in conventional presses, the invention contemplates the formation, as an incident to the initial reduction of the scrap, of bales of such a shape that a unit may be formed wherein the abutting ends of the bales will engage one another in an interlock which, independently of the tie elements will resist displacement, in one or more directions, of the bales. Thus, referring to Figure 4, it will be noted that the ram 19 of the press 5a is of such a shape that a tenon-like projection 20 is formed upon one end of the bale. By arranging two of these bales, as shown in Figure 5, prior to the application of the tie elements, a unit 16a may be formed wherein the projections 20 cooperate with one another and with the tie elements to prevent separation of the bales.

The press 5b shown in Figure 6 is generally similar to that illustrated in Figure 4 except that the ram 19a is so formed that the side and end faces of the projection 20a of the bale are normal with respect to one another. The unit indicated at 16b, which is formed of two such bales, is, therefore, similar to the unit 16a except as to the angularity of the faces of the cooperating projections.

I claim as my invention:

1. The method of producing, from pre-compressed, stable and self-sustaining bales of scrap metal of a density substantially less than that of solid steel, bar sections suitable for the manufacture of articles which do not have to be of high grade steel, which method comprises arranging a plurality of said bales, one against the other, to form an elongated assembly, arranging bars of substantially less width than said assembly lengthwise of said assembly in spaced relation with respect to the longitudinal edges thereof and across and transversely of a joint between adjacent faces of adjacent bales, pressing said assembly and tie elements together at ambient temperature to cause said elements to displace portions of the engaged bales and to thereby penetrate and become embedded in said bales to render said assembly stable and self-sustaining and provide a composite, multi-bale unit, and rolling said unit into a bar section of the character described.

2. The method of producing, from pre-compressed, stable and self-sustaining bales of scrap metal of a density substantially less than that of solid steel, bar sections suitable for the manufacture of articles which do not have to be of high grade steel, which method comprises arranging a plurality of said bales, one against the other, to form an elongated assembly, arranging tie elements of substantially less width than said assembly lengthwise of the assembly in spaced relation with respect to the longitudinal edges thereof and across and transversely of a joint between adjacent faces of adjacent bales, pressing said assembly and tie elements together at ambient temperature to cause said elements to displace portions of the engaged bales and to thereby penetrate and become embedded in said bales to render said assembly stable and self-sustaining and provide a composite, multi-bale unit, heating the unit, and then rolling it into a bar section of the character described.

3. The method of producing from scrap metal bar sections suitable for the manufacture of articles which do not have to be of high grade steel, which method comprises compressing the scrap into stable and self-sustaining bales of a density substantially less than that of solid steel and having end extensions which may be interlocked with one another, arranging a plurality of said bales, one against the other with the extensions of adjacent bales in interlocking relation, to form an elongated assembly, arranging tie elements of substantially less width than said assembly lengthwise of the assembly in spaced relation with respect to the longitudinal edges thereof and across and transversely of a joint between the interlocking ends of adjacent bales, pressing said bales and tie elements together at ambient temperature to cause said elements to displace portions of the engaged bales and to thereby penetrate and become embedded in said bales to render said assembly stable and self-sustaining and provide a composite, multi-bale unit, heating the unit, and then rolling it into a bar section of the character described.

ALEXANDER PATERSON.